(12) United States Patent
Bharghavan

(10) Patent No.: US 8,145,136 B1
(45) Date of Patent: Mar. 27, 2012

(54) WIRELESS DIAGNOSTICS

(75) Inventor: Vaduvur Bharghavan, San Jose, CA (US)

(73) Assignee: Meru Networks, Sunnyvale, CA (US)

( * ) Notice: Subject to any disclaimer, the term of this patent is extended or adjusted under 35 U.S.C. 154(b) by 722 days.

(21) Appl. No.: 12/208,924

(22) Filed: Sep. 11, 2008

Related U.S. Application Data

(60) Provisional application No. 60/995,283, filed on Sep. 25, 2007.

(51) Int. Cl.
*H04B 17/00* (2006.01)

(52) U.S. Cl. ............ 455/67.11; 455/423; 455/424; 379/1.01; 379/22.02

(58) Field of Classification Search .......... 455/67.11, 455/423, 424; 379/1.01, 22.02, 27.01, 29.01
See application file for complete search history.

(56) References Cited

U.S. PATENT DOCUMENTS

| | | | |
|---|---|---|---|
| 5,038,151 A | 8/1991 | Kaminski | |
| 5,337,397 A | 8/1994 | Lebby et al. | |
| 5,966,094 A | 10/1999 | Ward et al. | |
| 6,658,047 B1 | 12/2003 | Komulainen et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,925,300 B2 * | 8/2005 | Horne ............ 455/423 | |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,453,855 B1 | 11/2008 | Madhow | |
| 7,669,085 B2 * | 2/2010 | Alam et al. ............ 714/43 | |
| 2003/0198305 A1 | 10/2003 | Taylor et al. | |
| 2005/0111405 A1 | 5/2005 | Kanterakis | |
| 2005/0152314 A1 | 7/2005 | Sun et al. | |

OTHER PUBLICATIONS

Habib et al. "Multi-antenna techniques for OFDM based WLAN." Proceedings of First International Conference on Next-Generation Wireless Systems, Jan. 2006, pp. 186-190.
Kitahara et al. "A base station adaptive antenna for downlink transmission in a DS-CDMA system." IEEE 51st Vehicular Technology Conference Proceedings, 2000. (Abstract).
Mahler et al. "Design and optimisation of an antenna array for WiMAX base stations." IEEE/ACES International Conference on Wireless Communications and Applied Computational Electromagnetics, 2005. (Abstract).
Miaris et al. "On the base stations antenna system design for mobile communications." Electrical Engineering, 2006, pp. 157-163, vol. 88.
Miura et al. "Study of array pattern tuning method using hybrid genetic algorithms for figure-8 satellite's earth station antenna." Asia-Pacific Microwave Conference Proceedings, 2000. (Abstract).
Ponnapalli et al. "Design and packaging of antennas for wireless systems." Proceedings of Electrical Performance of Electrical Packaging, 1995. (Abstract).
Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003. (Abstract).

* cited by examiner

*Primary Examiner* — Tuan H Nguyen
(74) *Attorney, Agent, or Firm* — Law Office of Dorian Cartwright

(57) ABSTRACT

A method of analyzing a wireless network, including the steps of coupling a diagnostic station to a wireless network, injecting encapsulated wireless frames into that wireless network, forwarding encapsulated wireless frames within that wireless network, and in response to recognizing encapsulated wireless frames within that wireless network, de-encapsulating those wireless frames and forwarding them to that diagnostic station. Also, a system and a diagnostic station that can implement the method.

16 Claims, 5 Drawing Sheets

WIRELESS DIAGNOSTICS

CROSS REFERENCE TO RELATED APPLICATION

This application claims priority from U.S. Provisional Application No. 60/995,283, titled "Wireless Diagnostics," filed Sep. 25, 2007, in the name of the same inventor. This provisional application is hereby incorporated by reference as if fully set forth herein.

BACKGROUND OF THE INVENTION

1. Field of the Invention

This invention relates to diagnosis of wireless communications, for example between an access point and a mobile station.

2. Related Art

Diagnosing wireless networks is substantially more difficult than diagnosing wired networks: Link layer losses are non-negligible. Link state and channel state are often different at distinct ends of a communication link, e.g., at distinct ends of a communication link between an access point (AP) and a mobile station (MS). User experience is often both location-dependent and time-dependent, with the effect of providing a substantial challenge in problem reproducibility. Moreover, there is substantial variability between distinct types of mobile stations, with the effect that interaction between access points and mobile stations can be quite dependent upon the type of mobile station, and even the application being used by the mobile station.

This has the effect that signal degradation and network coverage might occur as problems, but be difficult to diagnose as they might appear as network handoff problems or other mobility issues, or vice versa. Moreover, untethered mobile stations often cannot contemporaneously report problems they are then experiencing, with the effect that many network problems involve difficult attempts to reproduce the problem environment at a later time.

One known solution is to maintain an activity log of network traffic at each access point, or at a controller for the network, with the effect of allowing a network administrator to review, after the fact, possible anomalies that might indicate network trouble. While providing at least some information about the nature of network traffic, this approach has the drawback that it is essentially passive in nature, and lacks the ability to sufficiently model the end-user experience with the network.

SUMMARY OF THE INVENTION

The invention addresses the foregoing needs with a system including a diagnostic station that is coupled to a wired network and a wireless network.

In one aspect, an embodiment of the invention is a method of analyzing a wireless network using such a station. The method includes at least the steps of coupling the diagnostic station to a wireless network, injecting encapsulated wireless frames into that wireless network, forwarding encapsulated wireless frames within that wireless network, and in response to recognizing encapsulated wireless frames within that wireless network, de-encapsulating those wireless frames and forwarding them to that diagnostic station.

In another aspect, an embodiment of the invention is a system that analyzes a wireless network using such a station. The system includes a wireless network including at least access points and mobile stations, a wired network, a diagnostic station, and a user interface client. The diagnostic station in turn includes at least a port to the wired network, a frame tunneling element, a virtual client element, a virtual hardware abstraction layer, and a monitoring element. The frame tunneling element, the virtual client element, and the virtual hardware abstraction layer inject encapsulated wireless frames into the wireless network through the wired network via the port. The frame tunneling element and the monitoring element de-encapsulate and collect, analyze, or both collect and analyze the encapsulated wireless frames received from the wireless network through the wired network via the port.

Yet another aspect of an embodiment of the invention is the diagnostic station itself.

This brief summary has been provided so that the nature of the invention may be understood quickly. A more complete understanding of the invention may be obtained by reference to the following description of the preferred embodiments thereof in connection with the attached drawings.

DETAILED DESCRIPTION OF THE INVENTION

Figure 1:
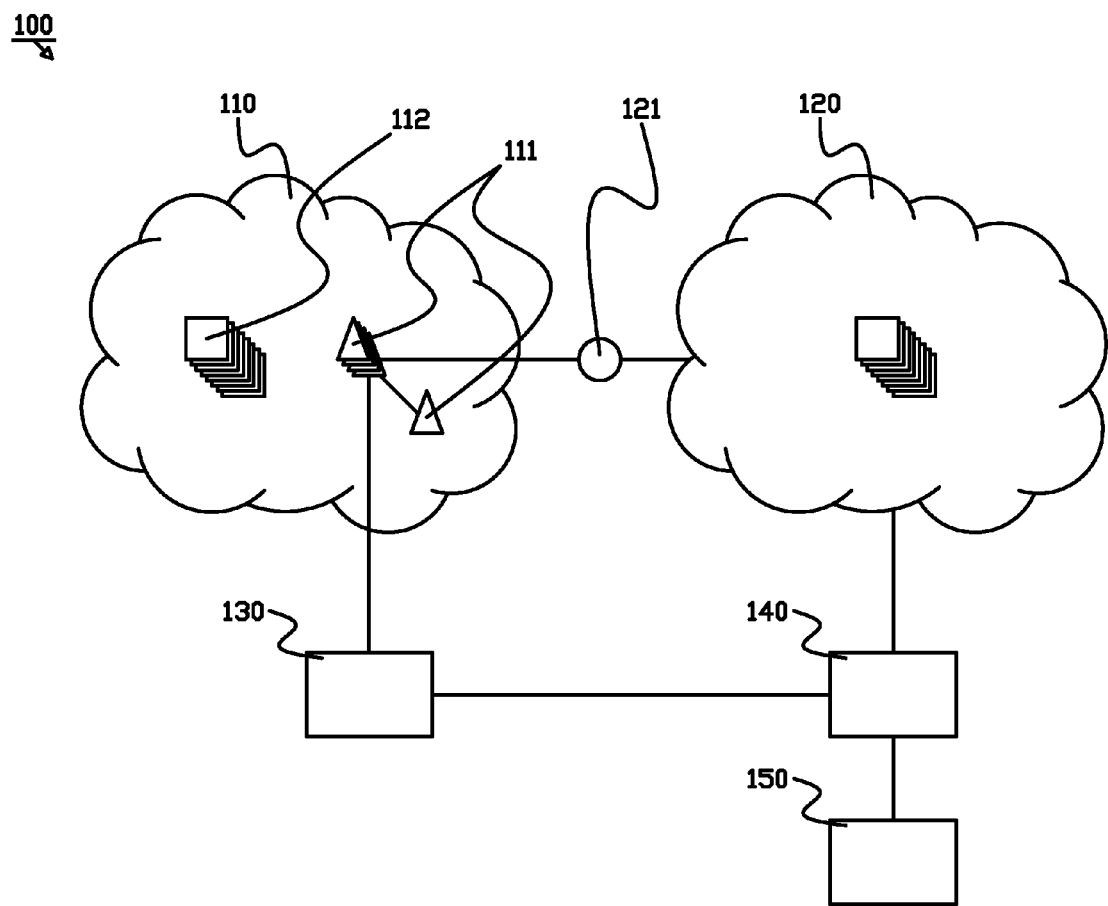
FIGS. 1 and 2 show block diagrams of one embodiment of a wireless diagnostic system.

The following co-pending applications are hereby incorporated by reference as if fully set forth herein:

U.S. patent application Ser. No. 11/715,287, titled "Seamless Mobility in Wireless Networks," filed Mar. 7, 2007, in the name of inventors Vaduvur Bharghavan, Sung-Wook Han, Joseph Epstein, Berend Dunsbergen, and Saravanan Balasubramanian.

U.S. patent application Ser. No. 11/525,246, titled "Wireless Rate Adaptation," filed Sep. 20, 2006, in the name of inventors Vaduvur Bharghavan, Starsky H. Y. Wong, Hao Yang, and Songwu Lu.

These applications are referred to as "the incorporated disclosures" below.

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.

References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

TERMS AND PHRASES

Read this application with the following terms and phrases in their most general form. The general meaning of each of these terms or phrases is illustrative, not in any way limiting.

The phrase "access points" or "AP", and variants thereof, generally refers to any device capable of being coupled to one or more mobile stations and capable of being coupled to a non-wireless medium. Access points might be coupled directly to a non-wireless medium, e.g., using copper wire or other signal-carrying media, or might be coupled indirectly, e.g., using wireless communication to other devices (possible other access points) which are themselves coupled, directly or indirectly, to a non-wireless medium. Although this application provides greater detail regarding embodiments in which access points primarily operate using an IEEE 802.11 protocol, there is no particular reason to limit any part of this application in this regard.

The phrase "control element", and variants thereof, generally refers to any device coupled to one or more access points and capable of coordinating the activities of those access points. Although this application provides greater detail regarding embodiments in which a control element associates mobile stations with access points, and in which that control element determines (at least in part) how those access points respond to those mobile stations, there is no particular reason to limit any part of this application in this regard.

The phrase "mobile station", and variants thereof, generally refers to any device in a wireless system that has the capability of being moved. Although this application provides greater detail regarding embodiments in which mobile stations include cellular telephones, portable computers, or other radio equipment, there is no particular reason to limit any part of this application in this regard.

The phrase "wireless network", and variants thereof, generally refers to any communication or computing system in which data are transmitted, received, or maintained using a wireless medium. Although this application provides greater detail regarding embodiments in which wireless systems use an IEEE 802.11 protocol, there is no particular reason to limit any part of this application in this regard.

The phrase "virtual station" or "vSTA", and variants thereof, generally refers to a station such as a client, AP, BSS, or other part of a wireless network that is emulated for testing purposes.

The phrase "Basic Service Set" or "BSS", and variants thereof, generally refers to an AP connected to wired network and a set of wireless stations.

The phrase "OSI network layers", and variants thereof, generally refers to a definition of network layers, including L1 (physical layer), L2 (link layer), and L3 (network layer)

The phrase "IEEE 802.1x", and variants thereof, generally refers to a framework for authenticating and controlling user traffic to a protected network, as well as dynamically varying encryption keys. 802.1X ties EAP to both the wired and wireless LAN media and supports multiple authentication methods, such as token cards, Kerberos, one-time passwords, certificates, and public key authentication.

The phrase "Service Set Identifier" or "SSID", and variants therefore, generally refers to a unique identifier attached to the header of packets sent over a WLAN that acts as a password when a mobile device tries to connect to a BSS. The SSID differentiates one WLAN from another, so all access points and all devices attempting to connect to a specific WLAN must use the same SSID. A device will not be permitted to join the BSS unless it can provide a unique SSID. Because an SSID can be sniffed in plain text from a packet it does not supply any security to the network.

The phrase "Basic Service Set Identifier" or "BSSID", and variants thereof, generally refers to a field uniquely identifies each BSS. Per IEEE 802.11-1999 Wireless Lan specification, a BSSID is the MAC address of the Station (STA) in an Access Point (AP) in an infrastructure mode BSS.

The phrase "MASK", and variants thereof, generally refers to a filter that selectively includes or excludes certain values.

The phase "Hardware Abstraction Layer" or "HAL", and variants thereof, generally refers to programming in an operating system that functions as an interface between a system's hardware and software, providing a consistent hardware platform on which to run applications. When a HAL is employed, applications do not access hardware directly but access the abstract layer provided by the HAL.

The phrase "Dynamic Host Configuration Protocol" or "DHCP", and variants thereof, generally refers to a protocol for assigning dynamic IP addresses to devices on a network. With dynamic addressing, a device can have a different IP address every time it connects to the network. In some systems, the device's IP address can even change while it is still connected. DHCP also supports a mix of static and dynamic IP addresses.

The following standard abbreviations are also used herein:
IP—Internet Protocol
QA—Quality Assurance
WEP—Wired Equivalent Privacy
WPA—Wired Equivalent Privacy (uses user authentication through EAP)
EAP—Extensible Authentication Protocol
PSK—Pre-Shared Key Overview of the Description A diagnostic station is coupled to a wired network and a wireless network. The diagnostic station includes a wireless user client stack, i.e., the diagnostic station includes elements capable of exchanging packets with peer processes in the diagnostic station, generating and parsing wireless network frames, and encapsulating and de-encapsulating those frames into tunneled wireless network frames.

Access points are provided with elements capable of identifying a set of tunneled wireless network frames destined for the diagnostic station. Access points ACK (acknowledge) those identified wireless network frames over the air, capture those frames, and send encapsulated versions of those frames to the diagnostic station using the wired network.

A user interface to the diagnostic station includes elements capable of allowing a network administrator (or other authorized user) to designate types of network traffic, inject frames into the wireless network, and monitor behavior over the air. This has the effect that the network administrator might use the diagnostic station to determine end-to-end parameters over the air, including without limitation loss rates, throughput, wireless data rates, and the like.

System

Figure 2:
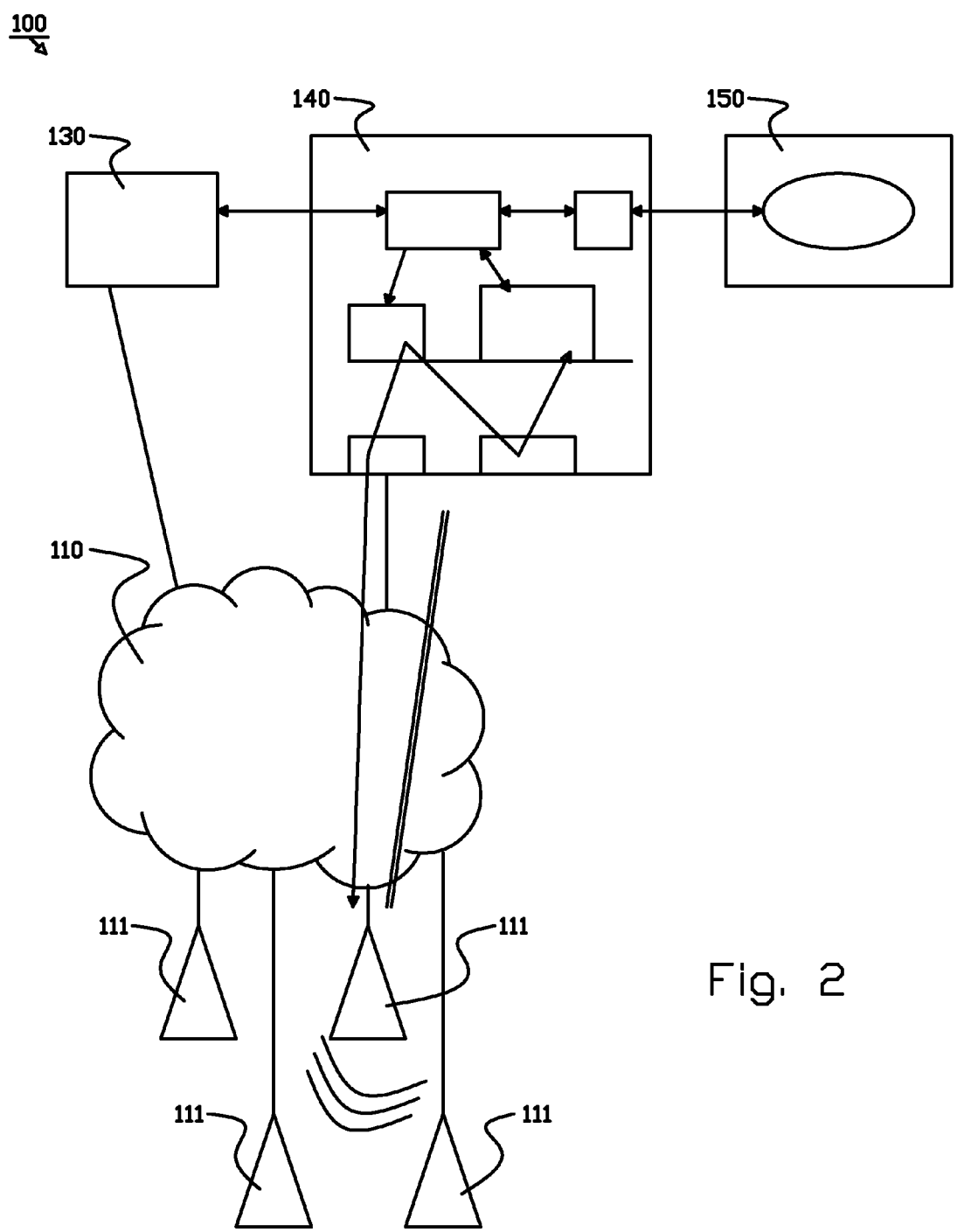

FIGS. 1 and 2 show block diagrams of one embodiment of a wireless diagnostic system. FIG. 1 shows a more general overview, while FIG. 2 shows some of the elements of the system in more detail.

A wireless system too includes elements as shown in FIG. 1, including at least: a wireless network 110, a wired network 120, a controller 13o, a diagnostic station 140, and a user interface client 150.

The wireless network 110 includes elements as shown in FIG. 1, including at least: a set of access points 111 and a set of mobile stations 112. Devices coupled to the wireless network 110 might communicate using radio communications in designated frequency bands and using known communication protocols. One such set of communication protocols includes the IEEE 802.11 series of communication protocols.

The access points 111 communicate using the wireless network 110 both between and among each other, and with the mobile stations 112. The access points 111 might also be coupled, directly or indirectly, to the wired network 120, as described below. The mobile stations 112 communicate using the wireless network 110 with the access points 111.

In one embodiment, communication using the wireless network 110 uses one or more of the IEEE 802.11 series of communication protocols, or a variant thereof. In these communication protocols, access points 111 and mobile stations 112 send messages in the form of wireless frames, each of which includes a header indicating its destination.

While embodiments are described with greater detail with respect to the IEEE 802.11 series of communication protocols, in the context of the invention, there is no particular requirement that the wireless network 110 use those protocols, either exclusively or at all, or that the wireless system 110 or the invention need be limited in that way.

While embodiments are described with greater detail with respect to devices primarily coupled to the wireless network 110 primarily using radio communication between and among each other, in the context of the invention, there is no particular requirement that those devices use radio communication either exclusively or even primarily, or that the wireless system 110 or the invention need be limited in that way.

The wired network 120 includes elements as shown in the FIG. 1, including at least: a set of connectivity elements 121 between and among devices coupled to the wired network 120. In one embodiment, these connectivity elements 121 include a LAN, a backplane, or other wired communication system (possibly including wireless communication elements). However, in alternative embodiments, the wired network 120 might include any alternative method of communication not subject to issues requiring possible diagnosis of the wireless network 110. The wired network 120 might include any other communication system substantially isolated from the wireless network 110. For example, the diagnostic station 140 might be coupled to the wired network 120 using a layer three Internet connection.

Controller

In one embodiment, the controller 130 might operate as described in the incorporated disclosures. In such embodiments, the control element 130 communicates with each access point 111 to control their responses to mobile stations 112. This has the effect that the controller 130 might choose to make all access points 111 appear substantially identical, as viewed by the mobile stations 112, with the effect that each mobile station 112 operating using an IEEE 802.11 protocol, or variant thereof, proceeds as if there were only a single access point 111.

Diagnostic Station

Figure 3:
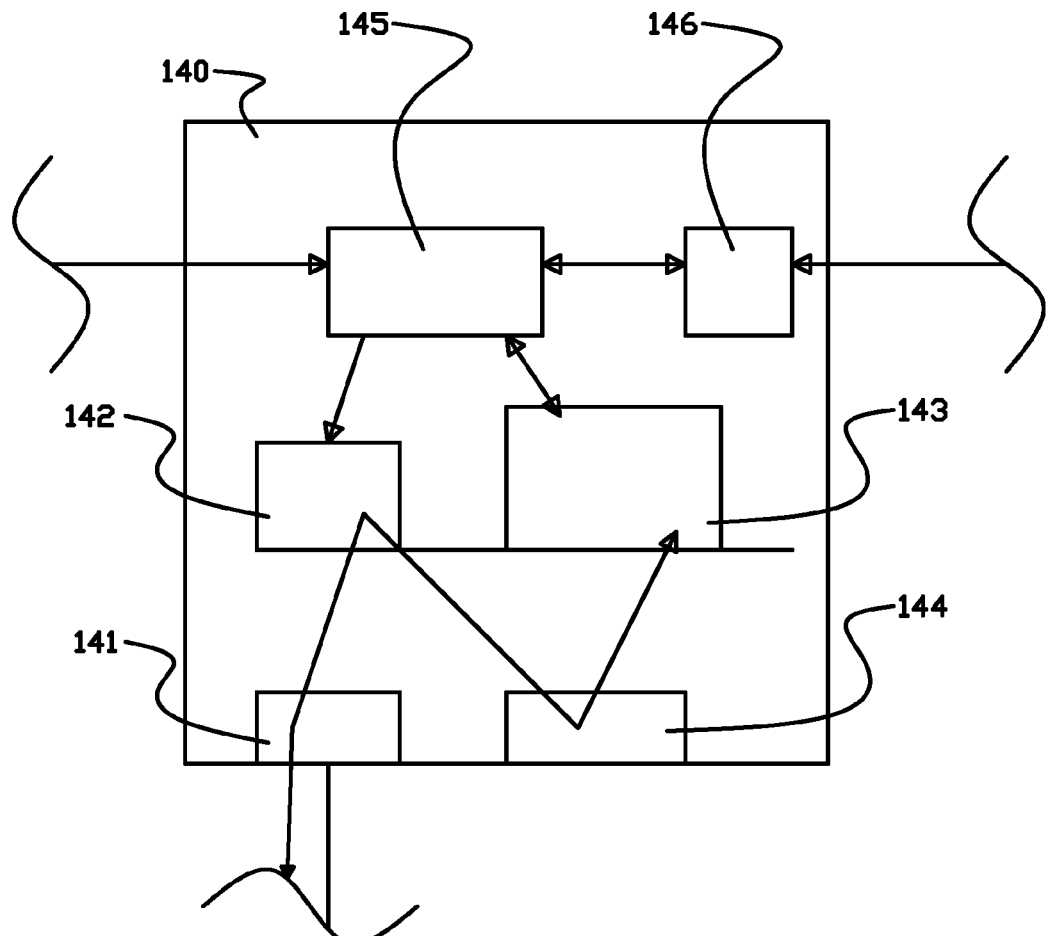
FIG. 3 shows one embodiment of a diagnostic station.

One embodiment of the diagnostic station 140 includes elements as shown in the FIG. 3, including at least: an Ethernet port 141 coupled to at least one access point 111, a frame tunneling element 142, a virtual client element 143, a virtual hardware abstraction layer (HAL) 144, a monitoring element 145, and a user interface server 146.

The frame tunneling element 142 includes software interpretable by a computing device to encode wireless frames by encapsulating them in (other) wireless frames, i.e., to encode a wireless frame whose payload is itself a (distinct) wireless frame. The frame tunneling element 142 also includes software interpretable by a computing device to decode wireless frames by de-encapsulating them from (other) wireless frames, i.e., to decode a wireless frame whose payload is itself a (distinct) wireless frame. This has the effect that the diagnostic station 140 might generate wireless frames which, when received by access points 111, might be decoded and forwarded as if they were sent to or from devices other than the diagnostic station 140 itself.

The virtual client element 143 includes software interpretable by a computing device to inject wireless frames into the wireless network 110, and to receive wireless frames from the wireless network 110. In one embodiment, the virtual client element 143 includes a set of peer processes, each of which is capable of sending and receiving wireless frames. This has the effect that the peer processes in the virtual client element 143 might send and receive wireless frames between and among each other.

The virtual hardware abstraction layer 144 includes software interpretable by a computing device to route wireless frames, e.g., IEEE 802.11 frames, to and from devices using the wired network 120. This has the effect that the virtual client element 143 might send or receive wireless frames to or from either devices using the wireless network 110 or devices using the wired network 120.

The monitoring element 145 includes software interpretable by a computing device to determine what electromagnetic or other effects the wireless network 110 has on wireless frames injected into the wireless network 110. For example, the monitoring element 145 might determine wireless parameters measured between devices using the wireless network 110. These wireless parameters might include, without limitation, throughput, loss rate, wireless data rate, received transmit power, number of interfering devices, and the like.

The user interface server 146 includes software interpretable by a computing device to interface with the user interface client 150. In one embodiment, the user interface client 150 includes a web browser using an HTTP or HTTPS protocol, or variant thereof, in which case the user interface server 146 includes a web server using an HTTP or HTTPS protocol, or variant thereof.

Access Points

The access points 111 communicate using the wireless network 110, and are also coupled to the wired network 120, either directly or indirectly as shown in FIG. 1. An access point 111 might be coupled directly to the wired network 120 using a connectivity elements 121, might be coupled indirectly to the wired network 120 by relaying using another access point 111, or might be coupled indirectly to the wired network 120 by relaying using another form of communication link.

When an access point 111 receives a wireless frame from the wired network 120, it forwards that wireless frame to the wireless network 110 in the ordinary course of operation.

Figure 4:
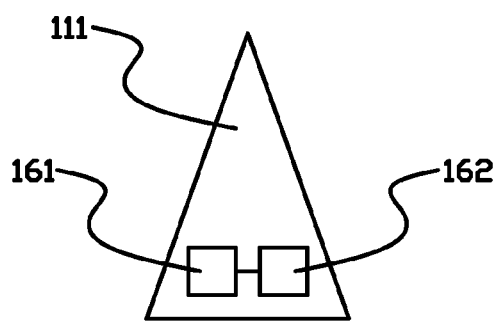
FIG. 4 shows an access point used in some embodiments of the wireless diagnostic system.

In preferred embodiments, at least some of the access points 111 include elements as shown in FIG. 4, including at least: a capture element 161 and a tunnel identifying element 162.

The capture element 161 includes software interpretable by a computing device to decode a wireless frame, re-interpreting its payload as a (distinct) wireless frame. The capture element 161, in response to a signal from the identifying element 162, forwards the encapsulated (i.e., payload) wireless frame from the access point 111 to the diagnostic station 140, using the wired network 120.

The identifying element 162 includes software interpretable by a computing device to determine if a particular wireless frame is intended (a) for forwarding to a mobile station 122 from the wired network 120, or from a mobile station 122 to the wired network 120, or (b) for forwarding from the access point 111 to the diagnostic station 140.

In one embodiment, the identifying element 162 determines whether a particular wireless frame is from either (1) a selected MAC address, (2) a selected BSSID or SSID, or (3) a particular diagnostic station 140 endpoint and port, i.e., a selected IP address and port.

If the particular wireless frame is from any one of these possibilities, the identifying element 162 signals the capture element 161 to ACK the wireless frame as if received by the access point 111, and to forward the wireless frame, using the wired network 120 instead of the wireless network 110, to the diagnostic station 140.

If the particular wireless frame is not from any one of these possibilities, the identifying element 162 signals the capture element 161 to ignore the wireless frame, and signals the access point 111 to treat the wireless frame in its ordinary course of business.

User Interface

The user interface client 150 includes elements capable of allowing a network administrator (or other authorized user) to designate types of network traffic, inject frames into the wireless network, and monitor behavior over the air. This has the effect that the network administrator might use the diagnostic station to determine end-to-end parameters over the air, including without limitation loss rates, throughput, wireless data rates, and the like.

In FIG. 1, user interface client 150 is shown attached directly to diagnostic station 140. Alternatively, user interface client 150 could be part of diagnostic station 140 or could be connected to diagnostic station 140 through a connection or network such as but not limited to wireless network 110 or wired network 120.

Methods of Operation

Steps for possible methods of operation for embodiments of the invention are discussed below with reference to FIGS. 5 to 7. Preferably, the steps are executed in the order shown. However, the invention also encompasses embodiments in which the steps are executed in different orders, where possible, and in different arrangements, for example in parallel. The invention is not limited to these methods.

Figure 5:
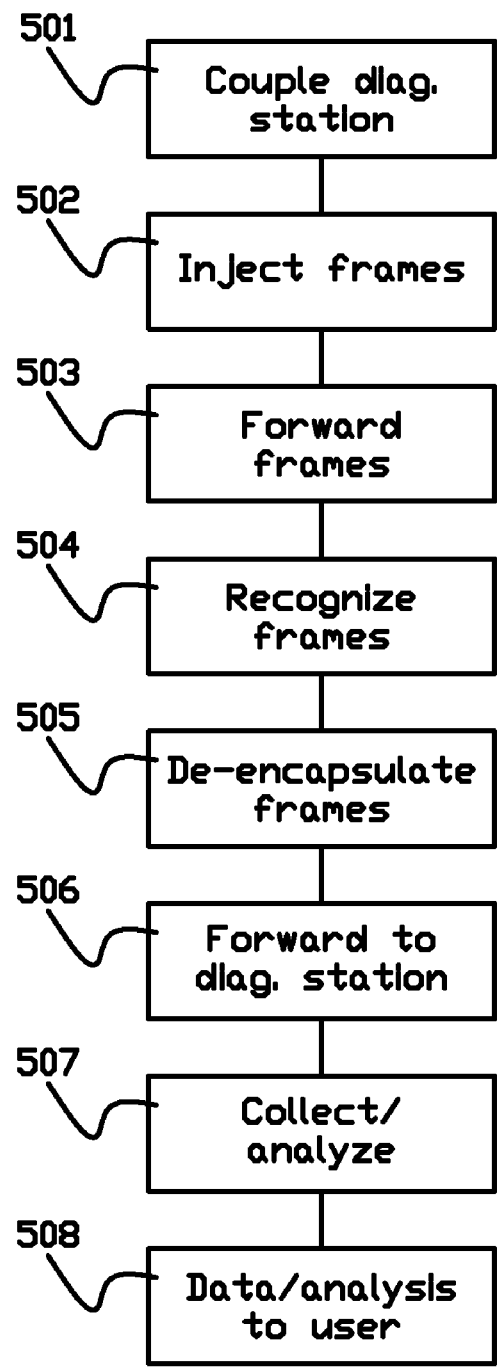
FIGS. 5 to 7 show some possible methods of operation for embodiments of the wireless diagnostic system.

FIG. 5 shows one possible method of operation for a diagnostic station in conjunction with access points.

In step 501, a diagnostic station such as the station 140 is coupled to a wireless network. Encapsulated wireless frames are injected into the wireless network in step 502. These frames can be injected by the diagnostic station through one or more access points, by a controller, or by any other element of the system, preferably at direction of a user through a user interface client. The encapsulated wireless frames are forwarded within the wireless network in step 503.

One or more access points such as those shown in FIG. 4 recognize the encapsulated wireless frames in step 504, de-encapsulate the frames in step 505, and forward the wireless frames to the diagnostic station in step 506.

In step 507, the diagnostic station collects data about and/or analyzes the frames forwarded to it. In step 508, the data and/or analysis are provided to a user, for example through a user interface client 150.

Figure 6:
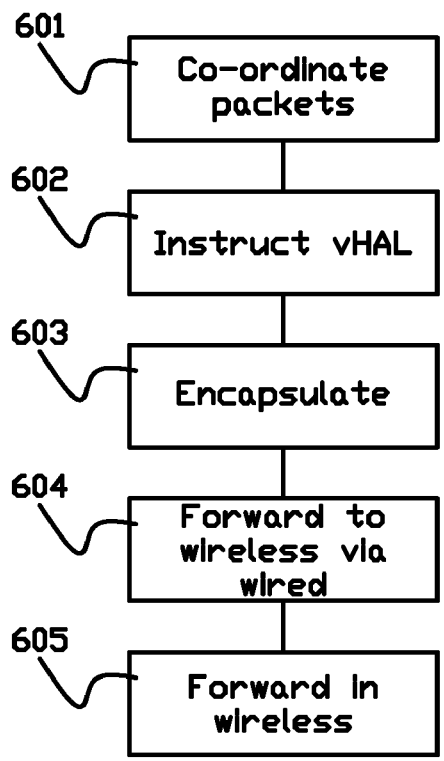

FIG. 6 shows one possible method of injecting wireless frames into the wireless network. In step 601, a monitoring element and virtual client element coordinate what packets to send to the wireless network, preferably at direction of a user through a user interface client. The virtual client element then instructs a virtual hardware abstraction layer to generate the packets in step 602. The packets are forwarded to a frame tunneling element for encapsulation in step 603. The encapsulated packets are injected into the wireless network through a port to a wired network in step 604, which in turn forwards the packets to one or more access points in the wireless network in step 605 for communication in the standard course of operation.

Figure 7:
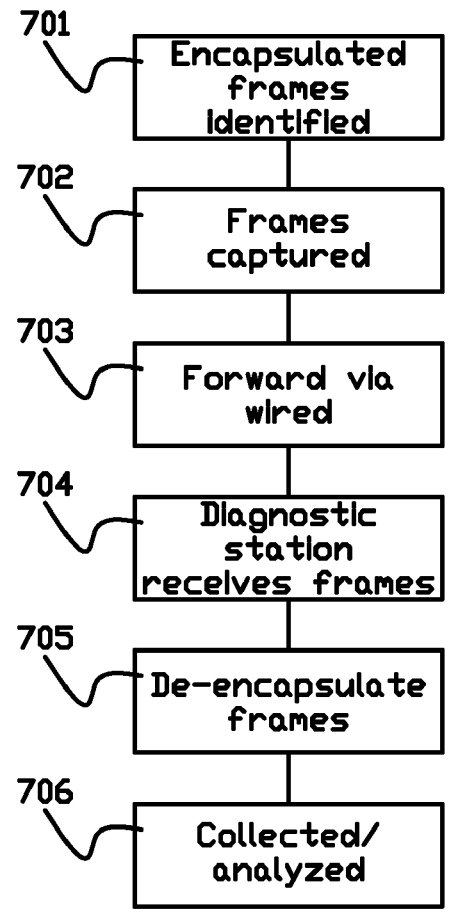

FIG. 7 shows one possible method for receiving wireless frames from the wireless network. In step 701, an access point with a tunnel identifying element determines that the access point has received encapsulated wireless frames. A capture element also included in the access point captures the encapsulated wireless frames in step 702 and forwards those frames to a diagnostic station via a wired network in step 703. The diagnostic station receives the encapsulated wireless frames via a port to the wired network in step 704. The frames are de-encapsulated by a frame tunneling element in step 705 and collected/analyzed by a monitoring element in step 706.

vSTA Implementation

Embodiments of the invention can be implemented by making the following changes and/or extensions to various parts of a network implemented using vSTAs:

General

Make vSTAs reliable for higher client count.

Add L2 security including WEP, PSK, and IEEE 802.1x.

Add client probe/assoc request that has an extensible capability field to identify whether a specific AP (by serial number) is the only one to respond to a client request. This is to test a specific AP rather than connectivity to a virtual cell.

Access Points

Add ability to externally specify a BSSID.

Add ability to specify a diagnostic endpoint (IP and port).

For any frame whose destination matches the BSSID/MASK, forward 802.11 frame to the diagnostic endpoint. Preferably reuse packet capture for this purpose.

For any frame transmitted by the diagnostic endpoint, forward 802.11 frame over the air on the specified radio. Preferably create a packet injector capability.

Add ACK frames for APs BSSID/MASK.

Virtual Client Devices

Add a virtual HAL so that all 802.11 frames can be routed through a local raw socket interface. This preferably permits an ability to retarget all outgoing frames to an application (e.g., a virtual application) and to inject incoming frames from the application.

Add an encap/decap application that takes the 802.11 frames, encapsulates the frames in packet injector format, and forwards the packetized frames to an appropriate AP; and that also decapsulates frames from packet capture format, and retargets them to the virtual HAL.

Virtual Client Applications
  Created using vSTA. Preferably includes capabilities of an 802.1x client and a DHCP client.
  Preferably resides within or simulates residence within virtual client device.
  Preferably enabled to take configuration from a local monitoring/configuration application.
  Preferably has ability to report success/failure to monitoring/configuration application.
  Preferably has capability to perform L3 captive portal security.
Monitoring/Configuration Applications
  Configuration Part
  A programmable interface that preferably specifies the binding of some group of <MAC, username, userid, password, certificate, SSID, BSSID, L2 access mode, L3 access mode, AP binding, etc.> (some fields are optional).
  Preferably ties a BSSID/MASK specification, MAC-AP binding, and client behavior—communicates with APs to set BSSID/MASK.
  Preferably resides within or simulates residence within virtual client and configures virtual client.
  Monitoring Part
  Preferably reports errors by alarm or notification to designated monitoring application (controller, EzRF, external box, back to corporate site or supplier site, etc.).
  In some embodiments, can communicate with controller of virtual device (combination of pull and push) to get other error notifications.
  General
  Communicates with controller of virtual device, discovers the configuration, and creates the appropriate client end-to-end tests.
  Preferably includes capability to dynamically change the client-AP binding so that mobility, silent client behavior, etc. can be emulated.
Virtual Application Backend
  Create a web-based interface that allows the monitoring agent to specify tests and view results
  Use cgi to invoke CLI commands to drive the control application
  Embodiments of the invention can be implemented in other ways as well, some using vSTA and some not.
Generality of Invention In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

What is claimed is:

1. A method comprising:
  coordinating, by a diagnostic station, what packets to send to a wireless network;
  generating the packets;
  encapsulating the packets in wireless frames; and
  injecting encapsulated wireless frames into the wireless network, wherein the encapsulated wireless frames are forwarded within the wireless network, and in response to encapsulated wireless frames within the wireless network being recognized, the wireless frames being de-capsulated and forwarded back to the diagnostic station.

2. The method of claim 1, further comprising at least one or both of:
  collecting data from the wireless frames; and
  analyzing the wireless frames.

3. The method of claim 2, further comprising the diagnostic station providing collected data, analysis, or both to a user.

4. The method of claim 1, recognizing encapsulated wireless frames within the wireless network comprises:
  capturing, by an access point, the encapsulated wireless frames;
  forwarding the encapsulated wireless frames to the diagnostic station via a wired network; and
  de-encapsulating, by the diagnostic station, the encapsulated wireless frames.

5. The method of claim 1, wherein forwarding the encapsulated wireless frames comprises:
  providing an abstraction layer capable of routing the encapsulated wireless frames, without knowledge by a device routing the encapsulated wireless frames.

6. The method of claim 1, wherein coordinating what wireless packets to send to the wireless network comprises:
  routing the encapsulated wireless frames in a substantially closed loop from the diagnostic station, using at least a portion of the wireless network, back to the diagnostic station, whereby the diagnostic station obtains diagnostic information regarding a path associated with the closed loop.

7. The method of claim 6, wherein the diagnostic information comprises at least one of throughput, loss rate, wireless data rate, received transmit power, and number of interfering devices.

8. The method of claim 1, wherein
  generating one or more forwardable wireless frames having header information, the header information indicating the forwardable wireless frames are neither sent from nor directed to the diagnostic station.

9. The method of claim 1, wherein
  receiving a 1st the wireless frame at a 1st portal of a frame tunneling element, and encoding the 1st wireless frame as a payload in a 2nd wireless frame;
  and wherein the steps of de-encapsulating include steps of receiving said 2nd wireless frame at a 2nd portal of the frame tunneling element, and decoding the payload.

10. The method of claim 1, wherein
  at an access point, in response to the steps of recognizing, acknowledging one or more the encapsulated wireless frames as if received by the access point; and
  forwarding de-encapsulated wireless frames to said diagnostic station, wherein the steps of forwarding use a wired network.

11. The method of claim 1, wherein
identifying one or more the wireless frames directed by access points to the diagnostic station,
the steps of identifying being responsive to one or more of:
an address or port associated with the diagnostic station, the address or port not appearing in header information for the encapsulated wireless frames.

12. The method of claim 1, wherein injecting encapsulated frames into the network comprises:
injecting by at least one of the diagnostic station and an access point.

13. The method of claim 1, wherein coordinating what packets to send to the wireless network comprises:
sending packets from a first peer process within the diagnostic station to a second peer process within the diagnostic stations, the second peer process being independent from the first.

14. A diagnostic station, comprising:
a packet module, in the diagnostic station, to coordinate what packets to send to a wireless network;
a frame tunneling element to encapsulate the packets in wireless frames; and
a virtual client to inject encapsulated wireless frames into the wireless network, wherein the encapsulated wireless frames are forwarded within the wireless network, and in response to encapsulated wireless frames within the wireless network being recognized, the wireless frames being de-capsulated and forwarded back to the diagnostic station.

15. The diagnostic station of claim 14, wherein the frame tunneling element connects to an access point over a wired network, such that the access point forwards the packets from the wireless frames as if received from a device other than the diagnostic system.

16. A method comprising:
generating diagnostic wireless frames at the direction of a diagnostic station, each of the wireless frames comprising a header and a payload, the payload comprising an independent wireless frame the header comprising routing information for the independent wireless frame;
passively injecting the diagnostic wireless frames into the wireless network, including sending the diagnostic wireless frame to an access point for forwarding as if the access point had received the independent wireless frame from a device other than the diagnostic station; and
analyzing independent wireless frames to determine one or more wireless parameters associated with the wireless network.

* * * * *